(12) United States Patent
Tan et al.

(10) Patent No.: US 9,981,333 B2
(45) Date of Patent: May 29, 2018

(54) METHOD FOR MANUFACTURING ROTARY ARTICLE BY COLD METAL TRANSFER WELDING DEPOSITION AND ROTARY ARTICLE AS MANUFACTURED

(71) Applicant: General Electric Company, Schenectady, NY (US)

(72) Inventors: Wen Tan, Shanghai (CN); Renwei Yuan, Shanghai (CN); Hongyuan Shen, Shanghai (CN); Lei Yang, Shanghai (CN); Yong Liu, Shanghai (CN); Zhixue Peng, Shanghai (CN); Yanmin Li, Shanghai (CN); Guoshuang Cai, Shanghai (CN)

(73) Assignee: General Electric Company, Schenectady, NY (US)

( * ) Notice: Subject to any disclaimer, the term of this patent is extended or adjusted under 35 U.S.C. 154(b) by 183 days.

(21) Appl. No.: 14/442,225

(22) PCT Filed: Oct. 31, 2013

(86) PCT No.: PCT/US2013/067675
§ 371 (c)(1),
(2) Date: May 12, 2015

(87) PCT Pub. No.: WO2014/074379
PCT Pub. Date: May 15, 2014

(65) Prior Publication Data
US 2016/0297024 A1    Oct. 13, 2016

(30) Foreign Application Priority Data

Nov. 12, 2012 (CN) .......................... 2012 1 0452167

(51) Int. Cl.
*B23K 9/04* (2006.01)
*B23K 9/12* (2006.01)
(Continued)

(52) U.S. Cl.
CPC .............. *B23K 9/048* (2013.01); *B23K 9/124* (2013.01); *B23K 9/16* (2013.01); *B23P 15/006* (2013.01); *F04D 29/284* (2013.01)

(58) Field of Classification Search
CPC .... F04D 29/284; F04D 29/2222; F04D 17/10; F04D 29/624; B23K 9/048; B23K 9/124;
(Continued)

(56) References Cited

U.S. PATENT DOCUMENTS

| 4,798,930 A | 1/1989 | Geisseler |
| 4,842,186 A | 6/1989 | Doyle et al. |

(Continued)

FOREIGN PATENT DOCUMENTS

| CN | 85102327 A | 10/1986 |
| CN | 2058942 U | 7/1990 |

(Continued)

OTHER PUBLICATIONS

Unofficial English Translation of Chinese Office Action issued in connection with corresponding CN Application No. 201210452167.2 dated Jul. 14, 2015.

(Continued)

*Primary Examiner* — Igor Kershteyn
(74) *Attorney, Agent, or Firm* — GE Global Patent Operation

(57) ABSTRACT

A method for manufacturing a rotary article comprises: providing a cold metal transfer welding apparatus comprising a welding torch; providing a rotary substrate; providing a digital representation of the rotary article having at least one internal flo passage; defining a welding path on the rotary substrate based on the digital representation; rotating the rotary substrate while depositing a filler metal layer by (Continued)

layer on the welding path of the rotary substrate to form the rotary article; and separating the rotary substrate from the rotary article.

21 Claims, 5 Drawing Sheets

(51) Int. Cl.
*B23K 9/16* (2006.01)
*B23P 15/00* (2006.01)
*F04D 29/28* (2006.01)

(58) Field of Classification Search
CPC .... B23K 9/16; B23K 20/12; B23K 2201/001; B23P 15/006; F01D 5/34
See application file for complete search history.

(56) References Cited

U.S. PATENT DOCUMENTS

| | | | |
|---|---|---|---|
| 5,573,374 A * | 11/1996 | Giberson | B23P 15/006 416/186 R |
| 7,498,543 B2 | 3/2009 | Ruokolainen et al. | |
| 7,628,586 B2 * | 12/2009 | Feher | B23P 15/006 415/170.1 |
| 8,192,152 B2 | 6/2012 | Bunting | |
| 8,240,046 B2 | 8/2012 | Peretti | |
| 2006/0168808 A1 | 8/2006 | Lin et al. | |
| 2007/0151964 A1* | 7/2007 | Artelsmair | B23K 9/1333 219/137.2 |
| 2009/0026188 A1 | 10/2009 | Schorghuber | |
| 2009/0241339 A1* | 10/2009 | Hasselberg | B23K 9/046 29/889.1 |
| 2009/0242534 A1* | 10/2009 | Artelsmair | B23K 9/0737 219/137 PS |
| 2009/0274553 A1* | 11/2009 | Bunting | B23K 9/173 415/182.1 |
| 2009/0274556 A1* | 11/2009 | Rose | B23P 6/005 415/220 |
| 2010/0224609 A1 | 9/2010 | Rose | |
| 2012/0171517 A1 | 7/2012 | Yuschak et al. | |
| 2012/0233859 A1* | 9/2012 | Cattiez | B21D 26/021 29/889.7 |

FOREIGN PATENT DOCUMENTS

| | | |
|---|---|---|
| CN | 102052342 A | 5/2011 |
| DE | 3038708 A1 | 6/1982 |
| EP | 0170780 A1 | 2/1986 |
| EP | 0496181 A1 | 7/1991 |
| EP | 1354658 A2 | 10/2003 |
| EP | 2113330 A1 | 11/2009 |
| GB | 2440546 A | 2/2008 |
| JP | 2005054197 A | 3/2005 |
| JP | 2006239775 A | 9/2006 |
| JP | 2011529151 A | 12/2011 |
| WO | 20080046386 A1 | 4/2008 |
| WO | 20090144301 A1 | 12/2009 |
| WO | 2010011370 A1 | 1/2010 |
| WO | 2012037121 A1 | 3/2012 |

OTHER PUBLICATIONS

International Search Report and Written Opinion issued in connection with corresponding application PCT/US2013/067675 dated Mar. 18, 2014.

Hermans et al., "Process Behavior and Stability in Short Circuit Gas Metal Arc Welding", Welding Journal, vol. 78, Issue 4, pp. 137-141, 1999.

Pickin et al., "Evaluation of Cold Metal Transfer (CMT) Process for Welding Aluminium Alloy", Science and Technology of Welding & Joining, vol. 11, Issue 5, pp. 583-585(3), Sep. 2006.

Feng et al., "The CMT Short-Circuiting Metal Transfer Process and its Use in Thin Aluminium Sheets Welding", Materials & Design, vol. 30, Issue 5, pp. 1850-1852, May 2009.

Sequeira et al., "Innovative Process Model of Ti-6AI-4V Additive Layer Manufacturing Using Cold Metal Transfer", Conference Proceeding—Cranfield University, 2010.

"New Welding Discovery Could Radically Improve Manufacturing Practices", Cranfield University, Mar. 18, 2010.

Japanese Office Action issued in connection with corresponding JP Application No. 2015541811 dated Aug. 22, 2017.

Russian Office Action issued in connection with corresponding RU Application No. 2015115957 dated Aug. 24, 2017.

Pickin et al., "Evaluation of Cold Metal Transfer (CMT) Process for Welding Aluminium Alloy", Science and Technology of Welding & Joining, vol. 11, Issue 5, pp. 583-585, Sep. 2006.

\* cited by examiner

000# METHOD FOR MANUFACTURING ROTARY ARTICLE BY COLD METAL TRANSFER WELDING DEPOSITION AND ROTARY ARTICLE AS MANUFACTURED

BACKGROUND

The present invention relates generally to a method for manufacturing a rotary article, and, more specifically, to a method for manufacturing a rotary article such as impeller by cold metal transfer welding deposition, as well as the rotary article as manufactured.

Rotary articles which have internal passages, such as impellers with a plurality of internal flow passages, are not easy to manufacture by traditional manufacturing techniques such as casting or forging. Impellers are widely used inside pipes or conduits of equipment such as pumps, compressors and gas turbine engines to increase or decrease a pressure and flow of a fluid. For example, an impeller may be used in a centrifugal pump to transfer energy from a motor that drives the pump to the fluid being pumped by accelerating the fluid outwards from the center of rotation. The velocity achieved by the impeller transfers into pressure when the outward movement of the fluid is confined by the pump casing. A typical impeller includes a bore to receive a drive-shaft rotated by a motor or other drive mechanism and vanes having hollow spaces formed in interiors thereof to push the fluid radially, and is hard to manufacture by traditional manufacturing techniques due to its complicated structure.

A conventional method for manufacturing impellers is to divide and mold the impeller as several members and then join the separately molded members together by welding or other such joining methods. However, in comparison with integrally formed impellers, the impellers manufactured by joining separately molded parts of the impeller have relatively weak mechanical properties.

Presently, there is a method in which impellers are manufactured by a process including pre-milling, electrical discharge machining (EDM) roughing and EDM finishing. But the cycle time of this process is usually more than 5 weeks. Moreover, high plant and equipment (P&E) investment is needed for milling center and EDM machine. It is neither efficient nor economic due to the long cycle time and high P&E investment request.

Therefore, it is desired to provide a novel method for manufacturing rotary articles such as impellers on an efficient and economic basis.

BRIEF DESCRIPTION

The present disclosure relates to a method for manufacturing a rotary article. The method comprises: providing a cold metal transfer welding apparatus comprising a welding torch; providing a rotary substrate; providing a digital representation of the rotary article having at least one internal flow passage; defining a welding path on the rotary substrate based on the digital representation; rotating the rotary substrate while depositing a filler metal layer by layer on the welding path of the rotary substrate to form the rotary article; and separating the rotary substrate from the rotary article.

The present disclosure also relates to a method for manufacturing a rotary article, which comprises: providing a cold metal transfer welding apparatus comprising a welding torch; providing a rotary substrate; producing the rotary article by using the cold metal transfer welding apparatus to deposit a filler metal on the rotary substrate while and concurrently rotating or moving the rotary substrate and/or moving the welding torch; and separating the rotary substrate from the rotary article.

The present disclosure further relates to a rotary article having at least one internal flow passages, which is fabricated by depositing a filler metal layer-by-layer by way of cold metal transfer welding.

BRIEF DESCRIPTION OF THE DRAWINGS

The above and other aspects and features of embodiments of the present disclosure will become more apparent in light of the subsequent detailed description when taken in conjunction with the accompanying drawings in which.

DETAILED DESCRIPTION

Figure 1:
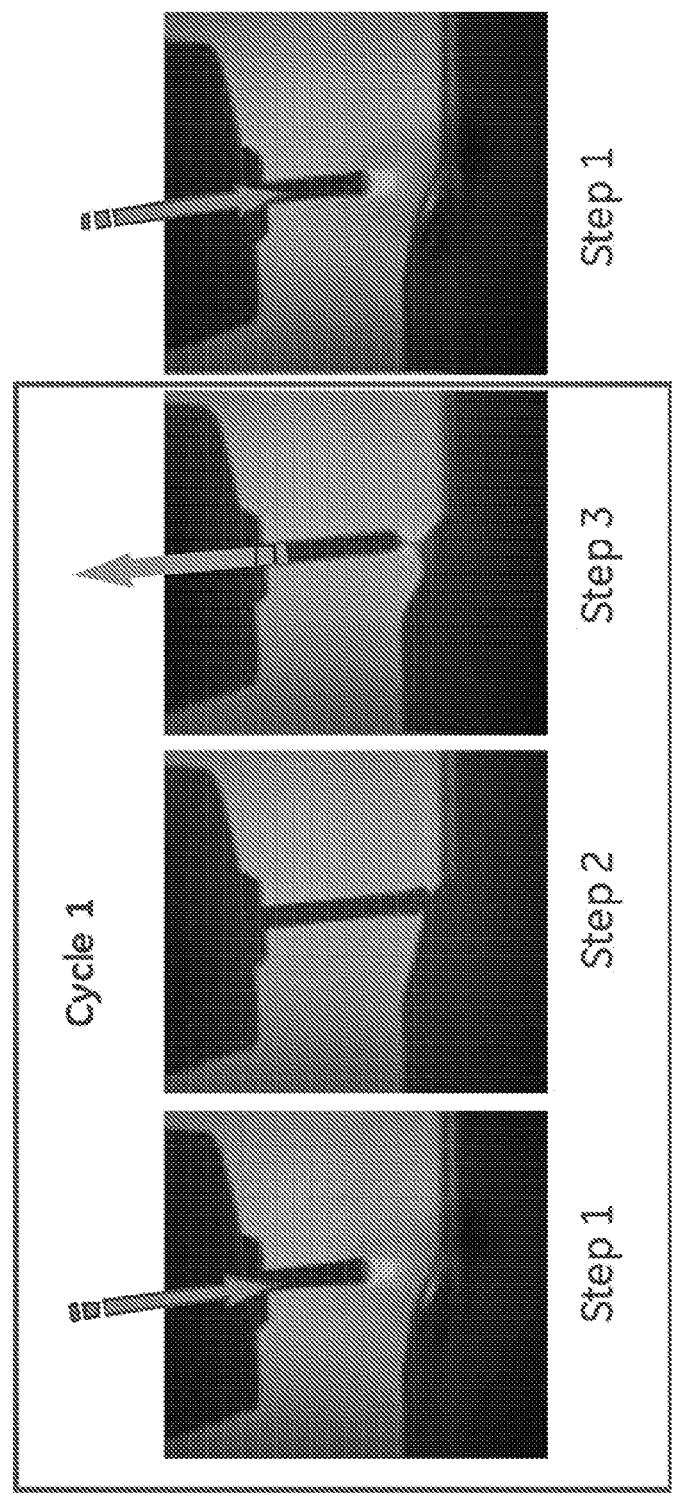
FIG. 1 is a schematic view showing the wire motion in a typical cold metal transfer welding (CMT) process.

Embodiments of the present disclosure will be described with reference to the accompanying drawings. In the subsequent description, well-known functions or constructions are not described in detail to avoid obscuring the disclosure in unnecessary detail.

Approximating language, as used herein throughout the specification and claims, may be applied to modify any quantitative representation that could permissibly vary without resulting in a change in the basic function to which it is related. Accordingly, a value modified by a term or terms, such as "about," is not to be limited to the precise value specified. In certain embodiments, the term "about" means plus or minus ten percent (10%) of a value. For example, "about 100" would refer to any number between 90 and 110. Additionally, when using an expression of "about a first value–a second value," the about is intended to modify both values. In some instances, the approximating language may correspond to the precision of an instrument for measuring the value or values.

Any numerical values recited herein include all values from the lower value to the upper value in increments of one unit provided that there is a separation of at least 2 units between any lower value and any higher value. As an example, if it is stated that the dosage of a component or a value of a process variable such as, for example, temperature, pressure, time and the like is, for example, from 1 to 90, preferably from 20 to 80, more preferably from 30 to 70, it is intended that values such as 15 to 85, 22 to 68, 43 to 51, 30 to 32 etc. are expressly enumerated in this specification. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner.

Unless defined otherwise, technical and scientific terms used herein have the same meaning as is commonly understood by one of skill in the art to which this invention belongs. The terms "first," "second," and the like, as used herein do not denote any order, quantity, or importance, but rather are used to distinguish one element from another. Also, the terms "a" and "an" do not denote a limitation of quantity, but rather denote the presence of at least one of the referenced items.

Embodiments of the present disclosure relates to a method for manufacturing a rotary article having at least one internal flow passage by cold metal transfer welding deposition, as well as the rotary article as manufactured. Since the method of the present disclosure is particularly applicable in manufacturing impellers, the description is directed to impellers, but can be used in manufacturing other rotary articles.

Cold metal transfer welding, which is commonly referred to as CMT, is a modified short-circuiting gas metal arc welding (GMAW) process, which is characterized by the cyclic alternation of an electric arc phase and a short-circuit phase. In a CMT process, the wire feeding system is synchronized with a digital control system and is capable of changing movement directions of the wire in response to the cyclic alternation. During an electric arc phase, a welding wire is moved towards a workpiece/substrate until contacting the workpiece/substrate, and the welding current and/or the welding voltage are controlled in a manner that the welding wire is melted rapidly at high transfer arc current to form a droplet. Once a short-circuit occurs, the digital control system senses the voltage drop and the reduces the current to significantly lower level, while the wire transport is reversed and the welding wire is moved away from the workpiece/substrate until the short-circuit is opened.

Therefore CMT incorporates welding current control with wire motion and physically withdraws the welding wire from the melting pool at a certain rate and pattern. Referring to FIG. 1, a typical CMT process may comprise the following steps: (1) moving a welding wire towards a weld pool on a workpiece/substrate; (2) lowering the electrical current while feeding the welding wire into the weld pool; (3) retracting the welding wire; and (4) repeating steps (1) to (3).

Such a cyclic alternation based on systematic discontinuing of the arc is capable of greatly reducing thermal input transferred to the workpiece/substrate, because the arc only inputs heat into the workpiece/substrate for a very short time during the arcing period. In comparison with conventional GMAW process, the workpiece/substrate and the weld zones remain much "colder" during a CMT process. The reduced thermal input offers the possibility of additive layer manufacturing large scale components using CMT. Moreover, the reduced thermal input offers advantages such as low distortion and higher precision, which also benefits the additive layer manufacturing process.

In a method for manufacturing a rotary article by CMT additive deposition, a rotary substrate is provided and a CMT apparatus comprising a welding torch is used to deposit a filler metal (welding wire) layer by layer on a pre-determined welding path of the rotary substrate to form the rotary article.

As used herein, the filler metal may be various metals or alloys which have a melting point and can be melted during the CMT additive deposition. Some non-limiting examples of the applicable metals or alloys include carbon steel, alloyed steel, nickel alloys, titanium alloys, and combinations thereof. The rotary substrate may have an outer circumference surface for a melted filler metal to be deposited on to form the rotary article, and it can be driven to rotate around a center axis during the deposition process. In certain embodiments, the rotary substrate may have a hole therein for allowing a cooling fluid to pass through during the CMT additive deposition, such that the substrate and deposit thereon can be controlled at a relatively low temperature. In a specific embodiment, the rotary substrate is a hollowed cylinder having a center hole along an axial direction thereof, and the center hole may function as the cooling hole for passing a cooling fluid, such as water.

Figure 2:
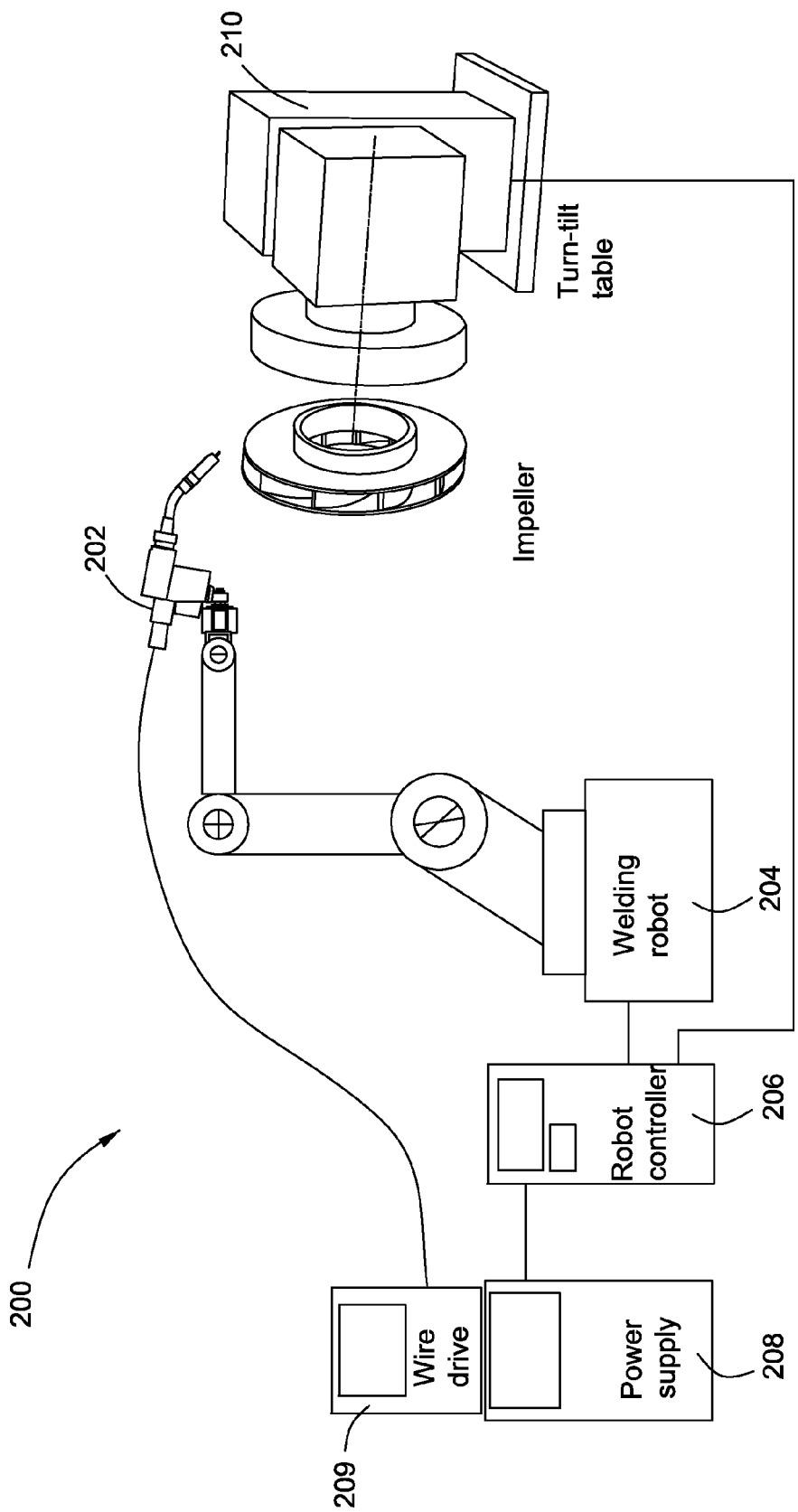
FIG. 2 shows an exemplary CMT system adapted to manufacture a rotary article.
Figure 3:
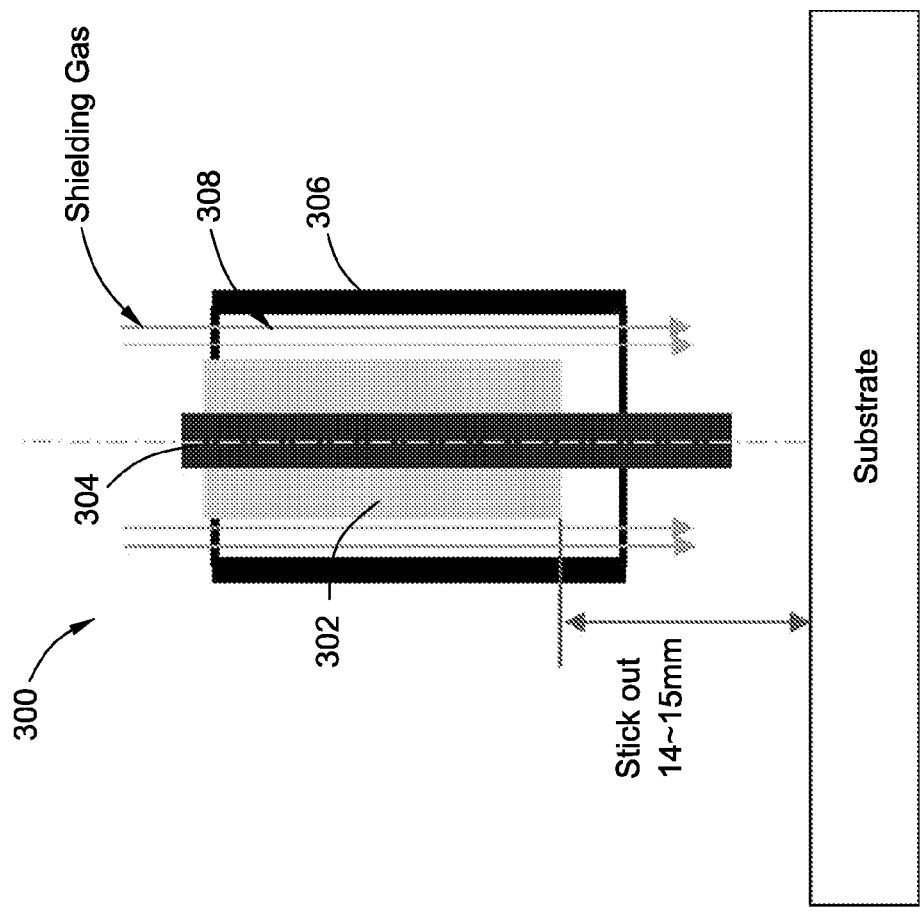
FIG. 3 is a schematic view showing a welding torch of a CMT apparatus.

In certain embodiments, as shown in FIG. 2, an exemplary system 200 applicable for manufacturing a rotary article by CMT additive deposition comprises a welding torch 202, a weld robot 204 for driving the welding torch 202 to move along a pre-determined welding path, a weld power supply 208 for supplying power to the welding torch 202, a wire drive 209 for feeding filler wire to the weld torch 202, a turn-tilt table 210 adapted for retaining and moving a substrate to be deposited on as well as the deposit on the substrate, and a robot controller 206 for controlling the weld robot 204 and turn-tilt table 210. In certain embodiments, as shown in FIG. 3, an exemplary welding torch 300 comprises a contact tip 302 for accommodating a welding wire 304 in a manner that the welding wire 304 stick out from a tip end of the contact tip 302, a nozzle shield 306 surrounding the contact tip 302 and defining an annular channel 308 surrounding the contact tip 302 for a shielding gas to pass through.

Before carrying out the additive deposition, a digital representation of the rotary article to be manufactured may be provided, and thus a welding path may be pre-determined based on the digital representation. In certain embodiments, the welding path may be determined by a process comprising: (1) correlating CMT deposition process parameters with deposit properties; (2) developing and identifying optimal process window (ranges) for CMT deposition; (3) modularizing CMT deposition database; and (4) developing algorithm of welding path generation and compensation for part distortion.

By depositing the filler metal layer by layer on the rotary substrate along the pre-determined welding path while continuously or discontinuously rotating the rotary substrate, it is able to build up a rotary article to near net shape.

Figure 4:
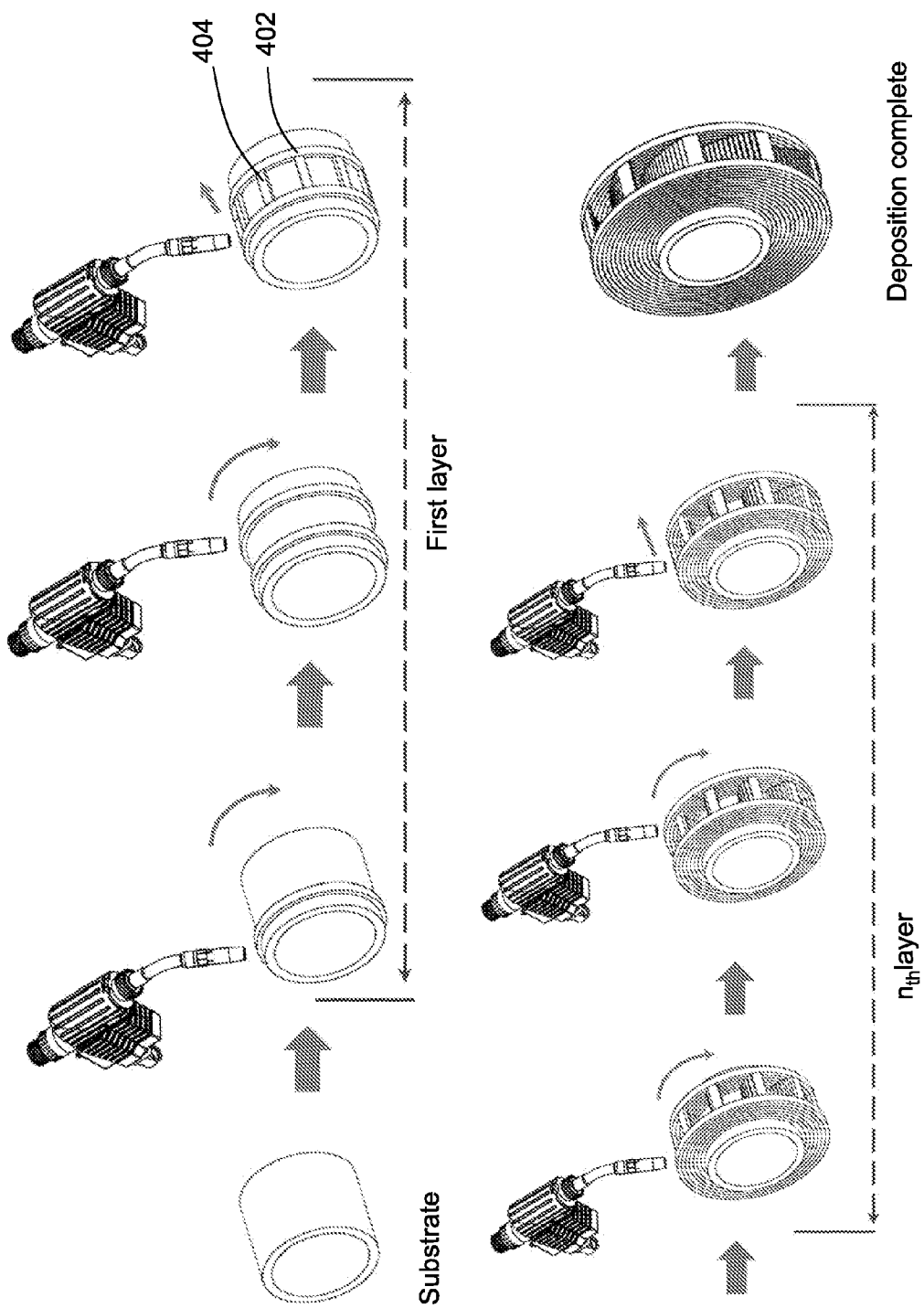
FIG. 4 shows an exemplary CMT deposition scheme for manufacturing a single piece impeller.

An exemplary single piece impeller deposition scheme is shown in FIG. 4. As shown, a process for manufacturing an impeller by CMT additive deposition comprises: (1) providing a rotary substrate, which can be driven to rotate around a center axis and has an outer circumference surface for a melted welding wire to be deposited on; (2) depositing a first layer of the welding wire material on the outer circumference surface of the rotary substrate along a pre-determined welding path, while discontinuously rotating the rotary substrate; and (3) continuously depositing a new layer onto the previous layer until the near net shape impeller is completed.

In certain embodiments, each layer may comprise at least one circle or near circle structure extending along or approximately parallel to a circumferential direction of the rotary substrate, like a structure 402 as shown in FIG. 4, and at least one blade structure intersecting with the at least one circle or near circle structure, like a structure 404 as shown in FIG. 4. Therefore the step of depositing each layer may comprise: at least a step of depositing a circle or near circle structure on the substrate while rotating the substrate, and at least a step of depositing a blade structure by moving the weld torch relative to the substrate along a direction intersecting with the circle or near circle structure (intersecting with the circumferential direction) while or not rotating the substrate.

In the illustrated embodiment, the impeller to be manufactured comprises two round end plates and a plurality of blades between the two end plates and defining a plurality of flow passages therebetween. The step of depositing each layer comprise: (i) depositing a circle or near circle structure while rotating the substrate; (ii) moving the weld torch and/or the substrate along or parallel to an axial direction of the substrate; (iii) depositing another circle or near circle structure while rotating the substrate; (iv) depositing a blade structure by moving the weld torch to trace the welding wire across the substrate along or parallel to an axial direction of the substrate while maintaining the substrate unrotated; (v) rotating the substrate; and (vi) repeating steps (iv) and (v) until the layer of all the blade structures are deposited.

In the step (v), the substrate may be rotated to an angle so as to deposit a blade structure adjacent to the previous one. In some other specific embodiments, in the step (v), the substrate may be rotated to a relatively larger angle so as to deposit a blade structure opposite or nearly opposite to the previous one, in order to reduce the shroud distortion that might occur to the article being manufactured. By optimizing the sequence for depositing different blade structures on a rotary article, particular a rotative symmetrical article, the shroud distortion that might occur to the article being manufactured can be greatly reduce.

During the depositing, the welding wire may be continuously fed to the welding torch. In certain embodiments, the wire feed rate ranges from about 3 m/min to about 10 m/min, or preferably from about 4.5 m/min to about 10 m/min.

After the article is built up to near net shape, the rotary substrate may be separated from the article before the article being further processed. Thereby a bore is formed in the rotary article at where is previously occupied by the rotary substrate. The bore is capable of receiving a rotatable drive-shaft. In certain embodiments, the article achieved by CTM additive deposition is further processed by EDM finishing.

The embodiments herein offer benefits over conventional manufacturing technologies. CMT additive deposition allows for a rotary article having internal flow passages to be built up to near net shape, and it can significantly reduce the roughing time and thereby increase productivity. More particularly, CMT additive deposition allows for articles to be built up to near net shape, thereby reducing material input, material waste, and overall manufacturing time. Applying only the amount of material needed to complete the article conserves raw materials, and material removal and finishing needs are greatly reduced. For example, compare to manufacturing impellers by a process including pre-milling, EDM roughing and EDM finishing, manufacturing impellers to near net shape by CMT additive deposition is able to increase productivity by about two times and reduce material usage by 15%. Moreover, CMT additive deposition allows for flexibility in changing or updating the design of the impeller quickly and at a lower cost when compared to conventional machining methods.

Example

Figure 5A:
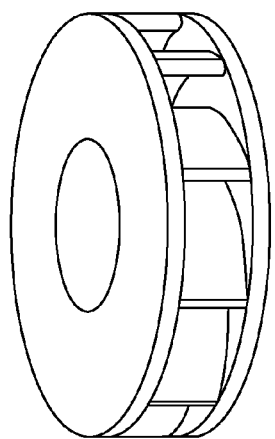
FIG. 5A is a perspective view of an exemplary impeller to be manufactured.

To demonstrate the suitability of manufacturing rotary articles by CMT additive deposition, an experiment was conducted to fabricate an impeller as shown in FIG. 5A. During the experiment, a 304 stainless steel substrate and a CMT system including a robot (Motoman UP50N), a turn-tilt table (YASKAWA Motopos) and a CMT welder (Fronius TPS4000 CMT (up to 400 A)) were used. The tip end of the contact tip of the CMT welder was spaced from the substrate by a distance ranging from about 14 mm to 15 mm. Argon (Ar) blended with 5% $CO_2$ by volume was used as the shielding gas. A welding wire made from a low alloy steel material ER90S-B3 and having a diameter of about 1.2 mm was used. The composition of ER90S-B3 by weight is shown in the following table.

| | Composition (wt %) | | | | | | |
| --- | --- | --- | --- | --- | --- | --- | --- |
| | C | Si | Mn | P | S | Cr | Mo |
| ER90S-B3 | 0.10 | 0.45 | 0.60 | 0.01 | 0.01 | 2.55 | 1.05 |

Figure 5C:
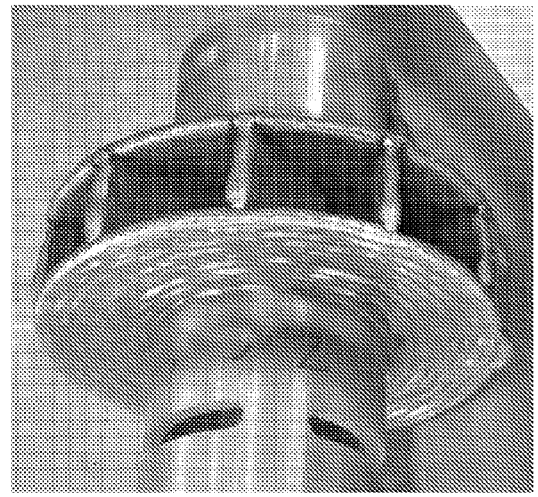
FIG. 5C is a picture showing a product of CMT additive deposition based on a digital representation of the impeller as shown in FIG. 5A.
Figure 5B:
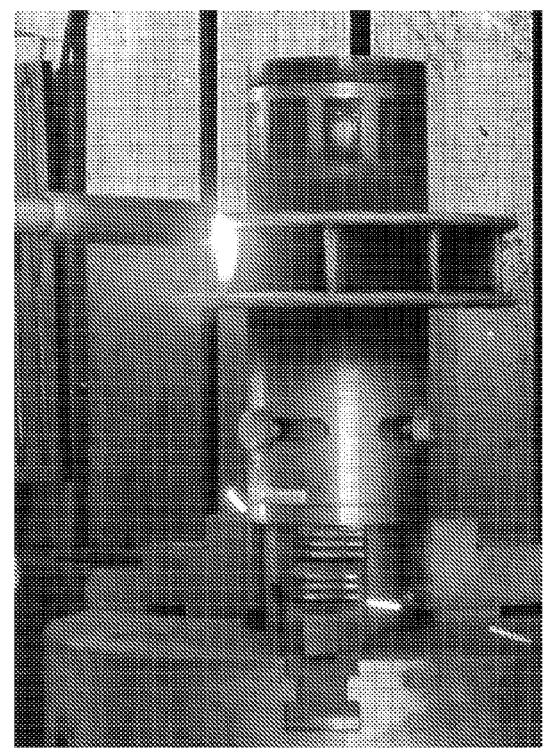
FIG. 5B is a picture showing an article being manufacturing by CMT additive deposition based on a digital representation of the impeller as shown in FIG. 5A.

The detailed experiment conditions and process parameters are described as follows.
Welding current: 130 A
Welding voltage: 14.5 V
Wire feed rate: 4.5 m/min
Welding speed: 0.3 m/min
Torch weaving: 5 Hz, 3 mm amplitude
Shield gas flow: 18 L/min
Layer thickness: 2 mm Referring to FIG. 5B, by attaching the rotary substrate to the turn-tilt table, and rotating the rotary substrate while depositing the wire material layer by layer on the welding path of the rotary substrate using the welding torch, a crack and porosity free near net shape impeller as shown in FIG. 5C was resulted within 1 day for the first trial. During the process, welding was regularly interrupted to allow heat dissipation.

While the disclosure has been illustrated and described in typical embodiments, it is not intended to be limited to the details shown, since various modifications and substitutions can be made without departing in any way from the spirit of the present disclosure. As such, further modifications and equivalents of the disclosure herein disclosed may occur to persons skilled in the art using no more than routine experimentation, and all such modifications and equivalents are believed to be within the spirit and scope of the disclosure as defined by the subsequent claims.

The invention claimed is:

1. A method for manufacturing a rotary article, the method comprising:
    defining a welding path on a rotary substrate based on a digital representation of the rotary article having at least one internal flow passage;
    rotating the rotary substrate while depositing layer by layer of a filler metal on the welding path of the rotary substrate to form the rotary article, wherein depositing each layer comprises:
        (i) depositing a circle or near circle structure on the rotary substrate while rotating the rotary substrate; and
        (ii) depositing a blade structure by moving a welding torch of a cold metal transfer welding apparatus, relative to the rotary substrate along a direction intersecting with the circle or near circle structure while maintaining the rotary substrate unrotated; and
    separating the rotary substrate from the rotary article.

2. The method of claim 1, wherein depositing each layer further comprises:
    (iii) moving at least one of the welding torch and the rotary substrate along or parallel to an axial direction of the rotary substrate;

(iv) depositing another circle or near circle structure while rotating the rotary substrate;

(v) rotating the rotary substrate; and (vi) repeating steps (ii) and (v) until each layer of all blade structures are deposited.

3. The method of claim 2, wherein in step (v), the rotary substrate is rotated to an angle so as to deposit a next blade structure adjacent to a previous blade structure.

4. The method of claim 2, wherein in step (v), the rotary substrate is rotated to an angle so as to deposit a next blade structure opposite or nearly opposite to a previous blade structure.

5. The method of claim 1, further comprising finishing the rotary article by electrical discharge machining.

6. The method of claim 1, further comprising cooling the rotary substrate and deposit thereon by passing a cooling fluid through a hole in the rotary substrate.

7. The method of claim 1, wherein the filler metal is selected from the group consisting of carbon steel, alloyed steel, nickel alloy, titanium alloy, and combinations thereof.

8. The method of claim 1, wherein the filler metal is fed at a rate ranging from about 3 m/min to about 10 m/min during the depositing.

9. A method for manufacturing a rotary article, the method comprising:
depositing layer by layer of a filler metal on a rotary substrate while concurrently performing at least one of rotating or moving the rotary substrate and moving a welding torch of a cold metal transfer welding apparatus, to form the rotary article, wherein depositing each layer comprises:
(i) depositing a circle or near circle structure on the rotary substrate while rotating the rotary substrate; and
(ii) depositing a blade structure by moving the welding torch relative to the rotary substrate along a direction intersecting with the circle or near circle structure while maintaining the rotary substrate unrotated or while rotating the rotary substrate; and
separating the rotary substrate from the rotary article.

10. The method of claim 9, further comprising finishing the rotary article by electrical discharge machining.

11. The method of claim 9, further comprising cooling the rotary substrate and deposit thereon by passing a cooling fluid through a hole in the rotary substrate.

12. The method of claim 9, wherein the filler metal is selected from the group consisting of carbon steel, alloyed steel, nickel alloy, titanium alloy, and combinations thereof.

13. The method of claim 9, wherein the filler metal is fed at a rate ranging from about 3 m/min to about 10 m/min during depositing.

14. A method for manufacturing a rotary article, comprising:
defining a welding path on a rotary substrate based on a digital representation of the rotary article having at least one internal flow passage;
rotating the rotary substrate while depositing layer by layer of a filler metal on the welding path of the rotary substrate to form the rotary article, wherein depositing each layer comprises:
(i) depositing a circle or near circle structure on the rotary substrate while rotating the rotary substrate; and
(ii) depositing a blade structure by moving a welding torch of a cold metal transfer welding apparatus, relative to the rotary substrate along a direction intersecting with the circle or near circle structure while rotating the rotary substrate; and
separating the rotary substrate from the rotary article.

15. The method of claim 14, wherein depositing each layer further comprises:
(iii) moving at least one of the welding torch and the rotary substrate along or parallel to an axial direction of the rotary substrate;
(iv) depositing another circle or near circle structure while rotating the rotary substrate;
(v) rotating the rotary substrate; and
(vi) repeating steps (ii) and (v) until each layer of all blade structures are deposited.

16. The method of claim 15, wherein in step (v), the rotary substrate is rotated to an angle so as to deposit a next blade structure adjacent to a previous blade structure.

17. The method of claim 15, wherein in step (v), the rotary substrate is rotated to an angle so as to deposit a blade structure opposite or nearly opposite to a previous blade structure.

18. The method of claim 14, further comprising finishing the rotary article by electrical discharge machining.

19. The method of claim 14, further comprising cooling the rotary substrate and deposit thereon by passing a cooling fluid through a hole in the rotary substrate.

20. The method of claim 14, wherein the filler metal is selected from the group consisting of carbon steel, alloyed steel, nickel alloy, titanium alloy, and combinations thereof.

21. The method of claim 14, wherein the filler metal is fed at a rate ranging from about 3 m/min to about 10 m/min during the depositing.

* * * * *